(12) United States Patent
Zhang

(10) Patent No.: US 10,419,273 B2
(45) Date of Patent: *Sep. 17, 2019

(54) STAND-BY CONTROLLER ASSISTED FAILOVER

(71) Applicant: Fortinet, Inc., Sunnyvale, CA (US)

(72) Inventor: Yong Zhang, Belmont, CA (US)

(73) Assignee: Fortinet, Inc., Sunnyvale, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 15/853,755

(22) Filed: Dec. 23, 2017

(65) Prior Publication Data

US 2018/0123872 A1    May 3, 2018

Related U.S. Application Data

(63) Continuation of application No. 14/559,321, filed on Dec. 3, 2014, now Pat. No. 9,853,855.

(51) Int. Cl.
 *H04L 12/24* (2006.01)
 *H04L 12/26* (2006.01)

(52) U.S. Cl.
 CPC ...... *H04L 41/0668* (2013.01); *H04L 41/0695* (2013.01); *H04L 43/0817* (2013.01); *H04L 43/10* (2013.01)

(58) Field of Classification Search
 CPC . H04L 41/0668; H04L 43/10; H04L 43/0817; H04L 41/0695
 See application file for complete search history.

(56) References Cited

U.S. PATENT DOCUMENTS

| | | | |
|---|---|---|---|
| 5,742,820 A | 4/1998 | Perlman et al. |
| 5,831,975 A | 11/1998 | Chen et al. |
| 5,930,472 A | 7/1999 | Smith |
| 6,092,155 A | 7/2000 | Olnowich |
| 6,331,984 B1 | 12/2001 | Luciani |
| 6,335,937 B1 | 1/2002 | Chao |
| 6,611,525 B1 | 8/2003 | Natanson et al. |
| 6,810,259 B1 | 10/2004 | Zhang |
| 7,844,719 B2 | 11/2010 | Detienne et al. |
| 8,483,609 B2 | 7/2013 | Miller |

(Continued)

OTHER PUBLICATIONS

Notice of Allowance for U.S. Appl. No. 14/559,321 dated Sep. 9, 2017.

(Continued)

*Primary Examiner* — Walter J Divito
(74) *Attorney, Agent, or Firm* — Jaffery Watson Mendonsa & Hamilton, LLP

(57) ABSTRACT

Methods and systems for standby controller aided failover are provided. According to one embodiment, an active control channel and an active data channel are established by an active controller with a managed device via a management protocol. A standby control channel and a standby data channel are established by a standby controller with the managed device via the management protocol. A keep-alive message is periodically sent by the standby controller to the active controller. When a response to the keep-alive message is not received by the standby controller within a predefined time, failover from the active controller to the standby controller is initiated by: (i) taking over for the active controller; and (ii) notifying the managed device to direct subsequent management protocol messages to the standby controller via the standby control channel.

9 Claims, 6 Drawing Sheets

(56) References Cited

U.S. PATENT DOCUMENTS

| | | |
|---|---|---|
| 9,577,872 B2 | 2/2017 | Ayandeh |
| 9,674,285 B2 | 6/2017 | Detienne et al. |
| 9,853,855 B2 | 12/2017 | Zhang |
| 2006/0030351 A1 | 2/2006 | Miller et al. |
| 2007/0206537 A1 | 9/2007 | Cam-Winget et al. |
| 2009/0195444 A1 | 8/2009 | Miller |
| 2011/0009055 A1 | 1/2011 | Miller |
| 2016/0098327 A1 | 4/2016 | Detienne et al. |
| 2016/0099827 A1 | 4/2016 | Ayandeh |
| 2016/0165463 A1 | 6/2016 | Zhang |

OTHER PUBLICATIONS

Final Rejection for U.S. Appl. No. 14/559,321 dated Mar. 7, 2017.
Non-Final Rejection for U.S. Appl. No. 14/559,321 dated Jun. 9, 2016.

STAND-BY CONTROLLER ASSISTED FAILOVER

CROSS-REFERENCE TO RELATED APPLICATIONS

This application is a continuation of U.S. patent application Ser. No. 14/559,321, filed Dec. 3, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present disclosure generally relate to failover operations in networks. More particularly, the present disclosure relates to systems and methods for standby controller assisted failover.

Description of the Related Art

In a typical enterprise setup, there may be several wireless access points (APs) installed within an enterprise network to provide access to information/data to devices connected thereto from within the enterprise network or from outside the enterprise network. To manage these APs and/or to grant access to devices connecting through the APs, a centralized network controller is typically configured. APs generally connect to the centralized network controller to authenticate client devices attempting to connect to the enterprise network via the APs. In most cases, an AP controller (also referred to hereafter simply as a controller) has a processor, a memory, and other resources required to interpret, forward, and process messages and initiate other messages as appropriate. In order to improve reliability of service, systems are provided for high availability devices that serve APs or other network elements such as routers, proxies, firewalls, gateways, switches, among other like devices without fail, for instance, by means of an active controller and a standby controller, where the standby controller takes over for the active controller when the active controller experiences a failure or the communication link between the active controller and the AP is down. For instance, there may be scenarios where the connection between an AP and a controller, which may be represented by software implemented within a network gateway or firewall device, may go down or the active controller may stop functioning, in which case, network security may be compromised or in-process transactions may be delayed or dropped unless or until the connection is re-established between the centralized controller and the AP.

In order to ensure high availability of servers, systems and other hardware or network components, a standby system is typically provided to takeover in case of a failure of the primary system. Such automatic switching over to a redundant or standby system from an active system upon the failure or abnormal termination of the previously active system is commonly referred to as failover. In the context of wireless networks, existing failover mechanisms rely on a heartbeat system involving the exchange of messages at a periodic interval (e.g., 30 seconds) between an active controller and the managed devices (e.g., one or more APs). For example, an AP or other managed network element may send a heartbeat message, also referred to as a keep-alive message, to the active controller and then wait for the response. If the network element receives a response to the keep-alive request from the primary controller within a predefined time limit, the AP can assume that the primary controller is working properly and may continue to forward requests to it. If the AP doesn't receive a response to the keep-alive request message within the predefined time, it assumes that the primary controller is not operational and begins sending all subsequent requests to the standby controller. Keep-alive messages may also serve the purpose of checking other health parameters of the active controller. In general, a keep-alive signal/message is often sent at predefined intervals, and the timing of same plays an important role in checking the connection between two network entities. After a signal is sent, if no reply is received from the other end, it can be assumed that the connection is down or that the primary controller has experienced a failure, and subsequent requests or data should be routed via another path or to an alternate resource (e.g., the standby controller).

In a typical enterprise network, there may be several APs sending such keep-alive messages to detect the operational status of the active controller. The overhead related to these keep-alive messages prevent the interval between keep-alive messages from being too short. While, ideally, a very short time interval would be preferred for optimal failover detection, a typical keep-alive message interval is on the order of 30 seconds to avoid overburdening the network. As such, it may take 90 seconds or more for APs to determine the failure condition and begin failing over to the standby controller.

There is therefore a need in the art for systems and methods that can enable efficient and fast failover from an active controller to a standby controller by reducing the time to detect a link failure or a failure of a primary/active controller.

SUMMARY

Methods and systems are described for standby controller aided fast failover of an active network controller managing network devices/elements. According to one embodiment, an active control channel and an active data channel are established by an active controller with a managed device via a management protocol. A standby control channel and a standby data channel are established by a standby controller with the managed device via the management protocol. A keep-alive message is periodically sent by the standby controller to the active controller. When a response to the keep-alive message is not received by the standby controller within a predefined time, failover from the active controller to the standby controller is initiated by: (i) taking over for the active controller; and (ii) notifying the managed device to direct subsequent management protocol messages to the standby controller via the standby control channel.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
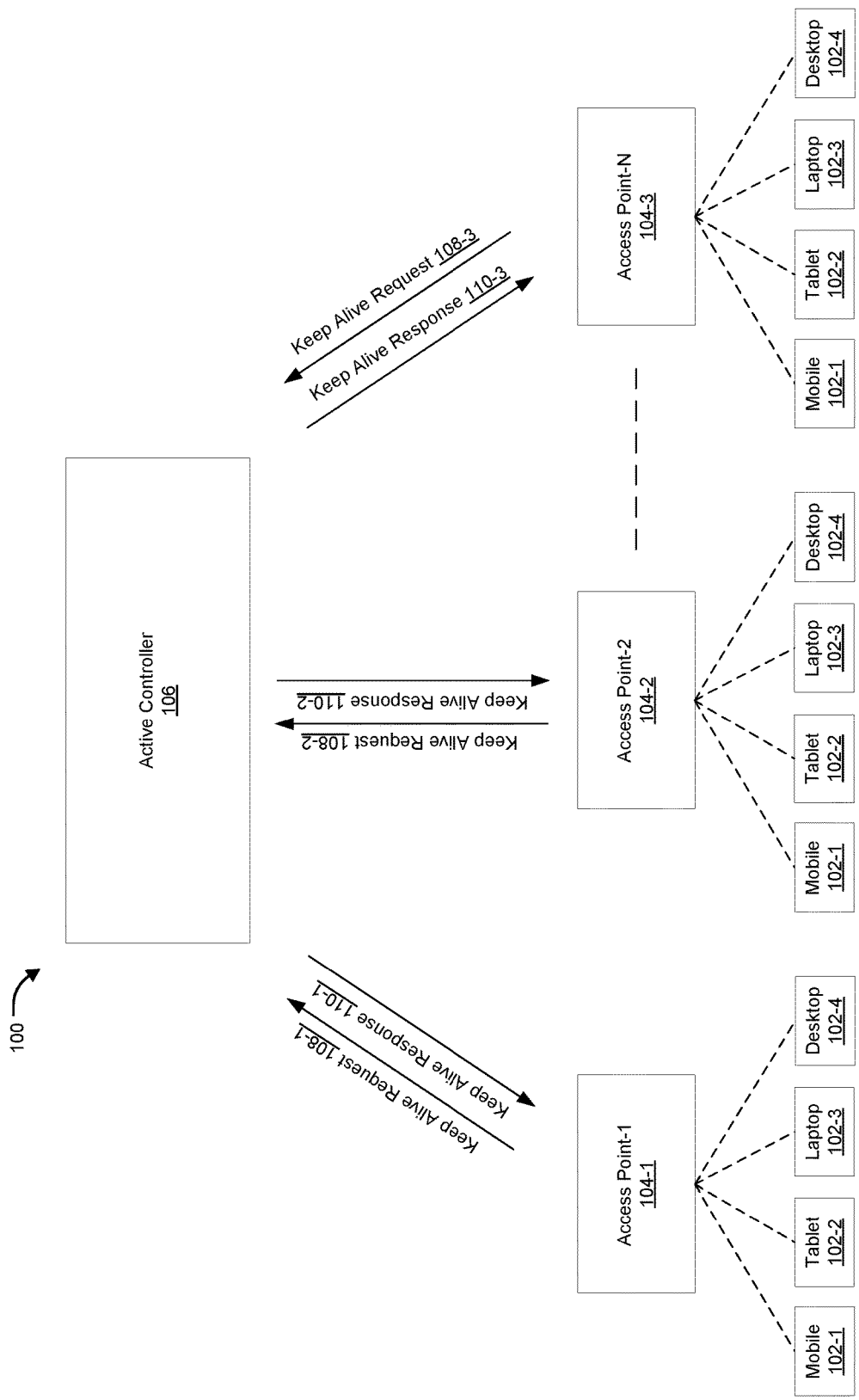
FIG. 1 illustrates a prior art heartbeat system in which keep-alive messages and response messages are exchanged between an active controller and the managed devices.

Methods and systems are described for standby controller aided failover. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

The phrase "management protocol" generally refers to a protocol through which a network controller (e.g., a wireless access controller) may control and/or provision a managed device (e.g., a wireless AP). A non-limiting example of a wireless control protocol is the Control and Provisioning of Wireless Access Points (CAPWAP) Protocol Specification defined by Request for Comments (RFC) 5415, which is hereby incorporated by reference in its entirety for all purposes.

Although the present disclosure has been described with the purpose of efficiently managing failover of active network controller, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named hardware, software, method or system.

Aspects of the present disclosure provide a standby network controller that can be configured to check the health status of an active network controller using short-term keep-alive messages and further establish a standby control channel and a standby data channel with network elements. In an example implementation, when the standby network controller detects failure of the active network controller, the standby network controller notifies the network elements through the standby control channel and takes over as the new active network controller.

An embodiment of present disclosure provides a method for fast failover of network controllers. The method includes the steps of establishing an active control channel and an active data channel between the active controller and managed network elements/devices, and establishing a standby control channel and a standby data channel between standby controller and the managed network elements. The method further includes periodically sending, by the standby controller, keep-alive messages to the active controller such that when a response to the keep-alive message is not received by the standby controller within a predefined time, failover from the active controller to the standby controller can be initiated. The method can further include the step of fast failover, from the active controller to the standby controller, wherein the fast failover can include the step of taking over, by the standby controller, of the active controller, and notifying, by the standby controller via the standby control channel, the managed network devices/elements to direct subsequent management protocol messages to the standby controller via the standby control channel.

In an aspect, managed network element(s)/device(s), upon joining a network, establish, using a management protocol, an active control channel and an active data channel with an active controller, and establish a standby control channel and a standby data channel with a standby controller. Further, by monitoring of keep-alive messages exchanged between the active controller and the standby controller, the standby controller can monitor the health of the active controller and take over the functions of active controller in case of non-receipt of response from active controller to any keep-alive message in predefined time while simultaneously (or within defined time based on configuration) informing the same to all the managed network element(s)/device(s) through the standby control channel, and directing them to synchronize with the standby controller and to route all subsequent control messages and data packets to the standby controller via the standby control channel and standby data channel respectively.

According to one embodiment, the keep-alive messages can be sent at a frequency greater than once per thirty-seconds. According to another embodiment, managed devices can include one or a combination of a wireless access point, a switch, a gateway, a proxy, a router, a hub and a network packet management element. According to yet another embodiment, taking over of the active controller by the standby controller can include causing active sessions with the active controller to be transferred from the active controller to the standby controller.

Aspects of the present disclosure provide an efficient standby controller assisted controller failover system, wherein the system can include an active control channel establishment (ACCE) module configured at an active controller to establish an active control channel with one or more managed network elements, an active data channel establishment (ADCE) module configured at the active controller to establish an active data channel between the active controller and the managed network elements. The system can further include a standby control channel establishment (SCCE) module configured at a standby controller to establish a standby control channel with the managed network elements and a standby data channel establishment (SDCE) module configured at the standby controller to establish a standby data channel with the managed network elements. The system can further include a message management module that can be configured on either the active controller or on the standby controller or on both the controllers, wherein the message management module can be configured to enable the standby controller to send at least one keep-alive message to the active controller. The system can include an active controller failure detection (ACFD) module configured at the standby controller to detect failure of the active controller, an active controller notification (ACN) module configured at the standby controller to notify the network elements (also interchangeably referred to managed devices/elements) of the failure of the active controller through the standby control channel(s), and an active controller takeover (ACT) module configured at the standby controller to enable the standby controller to take over as the new active controller.

In an exemplary embodiment, the message management module can be further configured at both the active controller and standby controller to send and receive keep-alive messages to one or more managed network devices. In an example embodiment, frequency of the keep-alive messages between the standby controller and the active controller can be higher than frequency of heartbeat messages between the network elements and the active controller and/or the standby controller.

In an aspect, taking over for the active controller can include causing active sessions with the active controller to be transferred from the active controller to the standby controller. In an example implementation, when a failover takes place and the standby controller starts acting as the active controller, all the managed network devices synchronize their configuration/settings with the standby controller (the new active controller).

According to an exemplary embodiment, the management protocol through which a network wireless controller can control and/or provision a managed device (e.g., wireless access point, a switch, a gateway, a proxy, a router, a hub, a network packet management element, a mobile, a tablet, a computer, a laptop, etc.) to setup control channel and/or data channel can include one or a combination of Lightweight AP Protocol (LWAPP) or Control and Provisioning of Wireless Access Points (CAPWAP) Protocol Specification defined by Request for Comments (RFC) 5415 or any other such protocol.

In another aspect, the message management module of the proposed system can be configured at any or both the active controller and the standby controller and can be used to enable the standby controller to send at least one or more keep-alive message(s) at predefined periodic intervals to the active controller and receive keep-alive response messages from the active controller, thus allowing the standby controller to monitor the health of the active controller. Further, the periodicity of keep-alive messages can be predefined or can be configured dynamically in real-time or can be any fixed time intervals of say every 10, 15, 20, 25 seconds or at any desired time interval.

FIG. 1 illustrates a prior art network architecture 100 in which keep-alive messages and response messages are exchanged between an active controller and the managed devices. As illustrated, the network architecture 100 shows multiple sets of user device(s) such as mobile 102-1, tablet 102-2, laptop 102-3, and desktop 102-4, which may be collectively and interchangeably referred to as user device(s) 102 hereinafter, connected to an active controller 106 through different managed network devices such as access point 104-1, access point 104-2, and access point 104-3, which may be collectively and interchangeably referred to as access point (AP) 104 or managed network device 104 or managed network element 104 hereinafter. Those skilled in the art will appreciate that although the present configuration shows use of AP 104, any other managed element/device can be incorporated as desired including but not limited to routers, switches, hubs, gateway devices, among others or a combination therefore, and therefore all such constructions/configurations are completely within the scope of the present disclosure.

According to one embodiment, active controller 106 can be configured to manage one or more network devices/elements such as APs 104, wherein each managed device 104 can provide wireless connectivity to end users/client devices 102. In an aspect, the active controller 106 can manage the managed devices 104, wherein, in a typical implementation, in order to provide redundancy over the controller 106, the network may have one or more standby network controllers (not shown) configured to takeover the functions of the active controller 106 in case the active controller 106 fails.

In prior art architectures, each managed network device/element 104 monitors the health of the active controller 106 by periodically sending heartbeat/keep-alive messages such as 108-1, 108-2, and 108-3, which may be collectively referred to as keep-alive messages 108 hereinafter, to the active controller 106 and receiving keep-alive responses such as 110-1, 110-2, and 110-3, which may be collectively referred to as keep-alive responses 110 or simply responses 110 hereinafter, from the active controller 106. In existing systems, the managed network devices/elements 104 send keep-alive messages 108 to periodically monitor and confirm the health of controller 106 such that whenever one or more managed network devices 104 do not receive a keep-alive response 110 from the controller 106, the managed network device(s) 104 conclude that the controller 106 is down and look to reroute the traffic through alternate routes. As, in the real-time, there may be hundreds of managed network devices 104, if all of these managed network devices 104 send keep-alive messages at frequent intervals, it may unnecessarily consume a large amount of bandwidth. Also, typically, the frequency of sending keep-alive messages is relatively low, say one in around 30 seconds, leading to a situation in which discovery of a failure of active controller 106 may be delayed for over 30 seconds.

Methods and systems of the present disclosure can be used to provide early failure detection of active controller 106 and fast failover, without consuming much of the bandwidth between the active controller 106 and the managed network devices 104. According to an aspect of the present disclosure, frequency of keep-alive requests sent from managed network device 104 to active controller 106 can be reduced and the standby controller can be configured to check the health status of active controller 106 with higher frequency of keep-alive messages.

In an example implementation, it is possible to completely avoid the burden on managed network devices in relation to checking the health status of the active controller. In an example implementation, one or more standby controller(s) can regularly check the status of active controller 106 using keep-alive messages, and can proactively inform the managed network devices 104 when the standby controller detects a failure of active controller 106.

Figure 2:
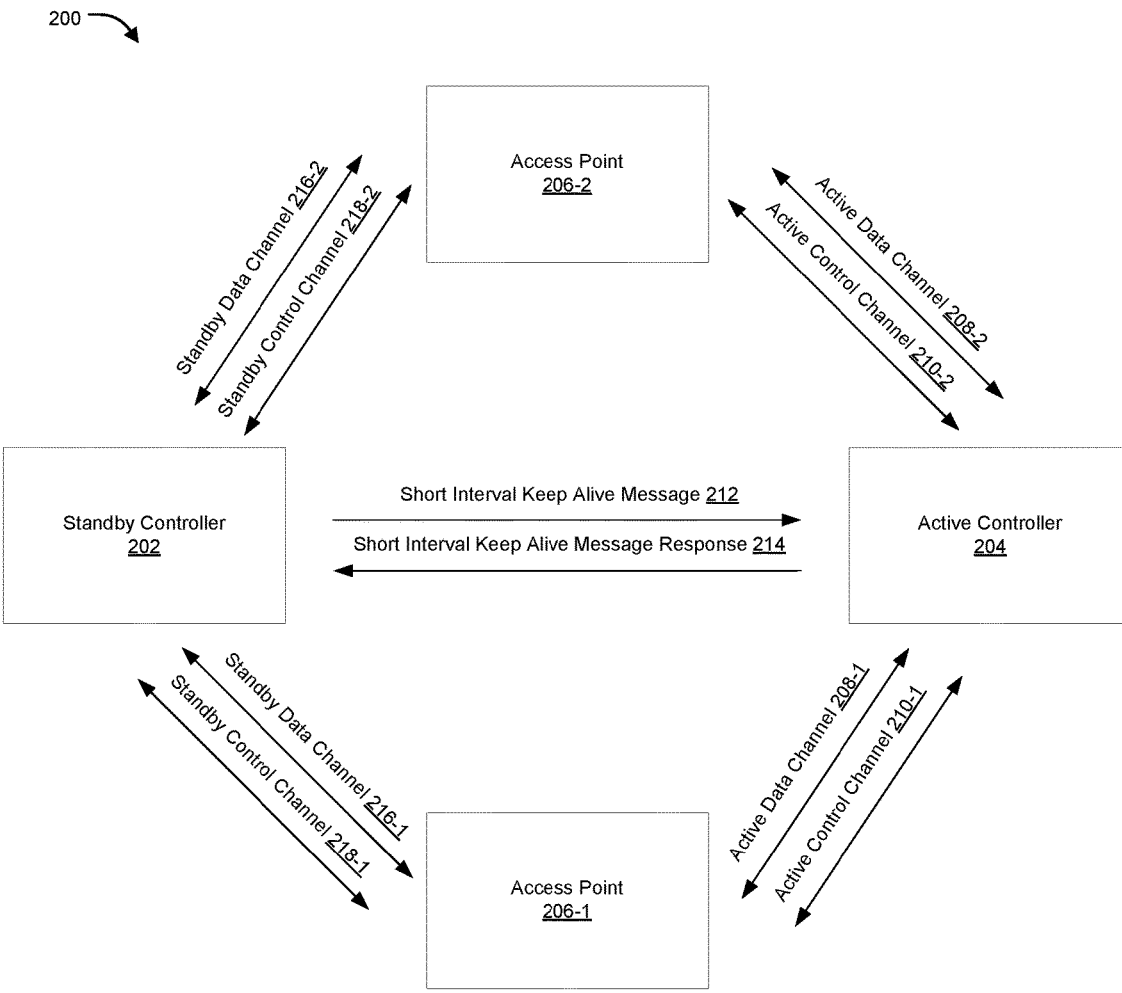
FIG. 2 is a simplified block diagram illustrating the relationships among network elements, an active controller, and a standby controller in accordance with an embodiment of the present disclosure.

FIG. 2 is an exemplary block diagram 200 illustrating relationships among network elements/managed devices 206-1 and 206-2, an active controller 204, and a standby controller 202 in accordance with an embodiment of the present disclosure. In the present simplified illustration, network architecture 200 includes at least one standby controller 202, an active controller 204, and one or more network elements (e.g., access points 206-1 and 206-2), which may be collectively referred to as managed devices, or managed network devices, or managed network elements, or managed elements hereinafter. In an aspect of the present disclosure, the standby controller 202 and the active controller 204 can be synchronized with one another with respect to their control configuration information, data settings, routing information, security parameters, content, or any other attributes/parameter/configuration. Further, standby controller 202 can constantly monitor the status and health of active controller 204 by periodically sending short-interval keep-alive messages 212 and receiving short-interval keep-alive responses 214 from active controller 204. According to one embodiment, the interval of keep-alive messages 212 from standby controller 202 to active controller 204 is less than the interval of keep-alive messages from network devices 206 to active controller 204.

Those skilled in the art will appreciate that standby controller 202 can check the health status of active controller 204 using keep-alive messages at a frequent interval without consuming any bandwidth between managed network elements 206 and active controller 204. In an exemplary embodiment, as soon as managed network elements 206 join network 200, they can setup data channels and control channels for traffic and management with both active controller 204 as well as standby controller 202. For example, access point 206-1 can setup an active data channel 208-1 and an active control channel 210-1 with active controller 204, and standby data channel 216-1 and standby control channel 218-1 with standby controller 202. Similarly, access point 206-2 can setup an active data channel 208-2 and an active control channel 210-2 with active controller 204, and standby data channel 216-2 and standby control channel 218-2 with the standby controller 202. In an exemplary embodiment, instead of two separate channels 208 and 210, a single channel can be used/set up for transmission of both control as well as data packets. Further, heart beat/keep-alive requests and responses can be periodically exchanged between the managed network devices 206, standby controller 202, and active controller 204 of network 200 periodically using either one or both of the data and control channels in order to monitor and check the health of all connected network elements. In an exemplary embodiment, the network elements 206 can be configured so as to not send keep-alive messages to the active and/or to the standby controller as in past architectures as this function is now performed by standby controller 202, which is also configured to initiate a failover when no response from active controller 204 is received to a keep-alive message for a defined or configurable period of time, thereby making the keep-alive messages between managed devices 206 and active controller 204 redundant.

According to one embodiment, standby controller 202 can check the health of active controller 204 by periodically sending short-interval keep-alive messages 212 and monitoring responses 214 received from active controller 204 such that whenever standby controller 202 does not receive a keep-alive message response 214 from active controller 204 for a defined or configurable period of time, it can conclude that active controller 204 has failed, in which case standby controller 202 can send a notification message to managed network devices 206 via standby control channels 218-1 and 218-2 so as to alert network devices 206 about the new active controller. In an exemplary embodiment, the frequency of exchange of keep-alive messages and keep-alive responses exchanged between standby controller 202 and active controller 204 can be greater than the frequency of heartbeat messages and responses exchanged between managed network devices 206 and active controller 204 and/or standby controller 202.

In an aspect, when a short-interval keep-alive response 214 is not received by standby controller 202 from active controller 204 within a predefined time, say 10 seconds, standby controller 202 can conclude that a failure of active controller 204 has occurred and standby controller 202 can send a notification message to the managed network elements 206 through the standby control channel 218 to indicate a controller failover. In another exemplary implementation, before concluding the failure of active controller 204, standby controller 202 can also be configured to send one or more keep-alive messages at the same or even shorter time intervals, such that if standby controller 202 does not also receive the response of the subsequent keep-alive messages (say 3 additional keep-alive messages), standby controller 202 can initiate the failover and start acting as the new active controller. In another implementation, managed network elements 206 can then synchronize with standby controller 202 and pass all traffic/communication through standby controller 202.

In an exemplary embodiment, the management protocol through which a network wireless controller can control and/or provision a managed device 206 (e.g., access point, router, mobile, tablet, computer, laptop, etc.) to setup control channel and data channel can be implemented through Lightweight AP Protocol (LWAPP) or Control and Provisioning of Wireless Access Points (CAPWAP) Protocol Specification defined by Request for Comments (RFC) 5415 or any other such protocol. In another embodiment, although the present disclosure has been explained with reference to one standby controller 202, the actual system can include multiple controllers 202 that can continuously, at defined and/or configurable time intervals, send short-interval keep-alive messages 212 to active controller 202, wherein such intervals can be the same or different for each standby controller 202 depending on the user/administrator configuration. In an aspect, the duration of time intervals for sending the keep-alive messages, responses to keep-alive messages, among other settings/configurations can always be modified as desired.

Figure 3:
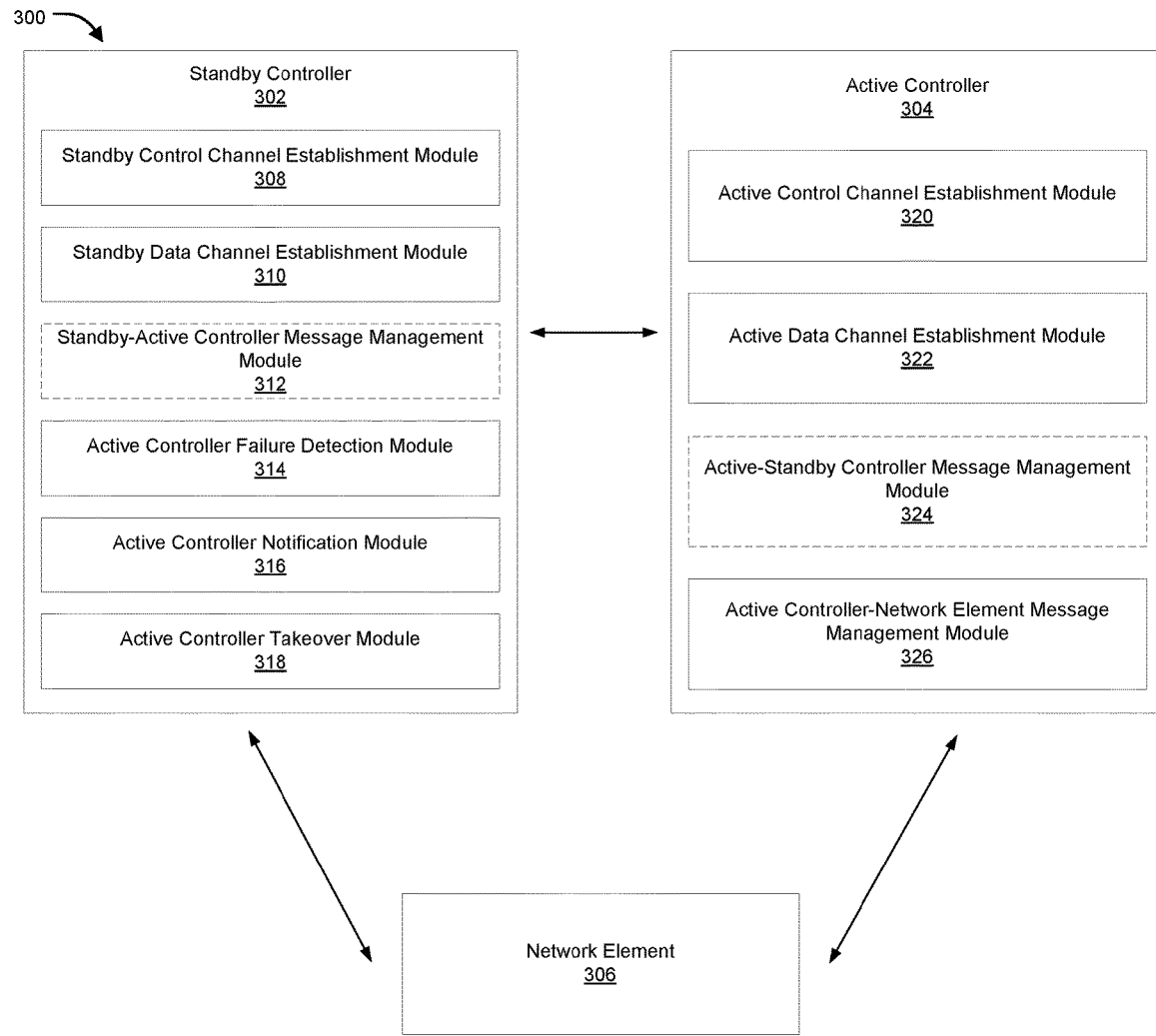
FIG. 3 illustrates exemplary functional modules of an active controller, a standby controller, and a managed device in accordance with an embodiment of the present disclosure.

FIG. 3 illustrates exemplary functional modules 300 of a failover system that can be implemented by an active controller 304, a standby controller 302, and one or more managed network element(s)/device(s) 306 in accordance with an embodiment of the present disclosure. Those skilled in the art will appreciate that although various examples within the present disclosure are explained with reference to one network element, the actual implementation may include multiple network elements, all or some of which can be configured to implement aspects/modules of the present disclosure. Furthermore, modules can be interpreted as a collection of sub-modules and therefore logical grouping of proposed modules into group-modules or division of the proposed modules into sub-modules is completely within the scope of the present disclosure.

In an aspect of the present embodiment, configuration of standby controller 302 and of active controller 304 can be identical, and the controllers can be defined as standby and active controllers on the basis of their functioning and role assigned in the network. As defined, a designated standby controller 302 remains in a standby role until the failure of the designated active controller 304 such that designated standby controller 302 takes over as active controller 304 when it detects the failure of designated active controller 304.

In an exemplary embodiment, standby controller 302 can be configured to include a standby control channel establishment module 308, a standby data channel establishment module 310, a standby-active controller message management module 312, an active controller failure detection module 314, an active controller notification module 316, and an active controller takeover module 318. In another aspect, the active controller 304 can be configured to include an active control channel establishment module 320, an active data channel establishment module 322, an active-standby controller message management module 324, and an active controller-network element message management module 326.

According to one embodiment, active control channel establishment module 320 can be configured within active controller 304 to create an active control channel with network element 306, and active data channel establishment module 322, on the other hand, it can be configured to create an active data channel with network element 306. Similarly, standby control channel establishment module 308 can be configured within standby controller 302 to create a standby control channel with network element 306, and a standby data channel establishment module 310 may be configured to create a standby data channel with network element 306. According to one embodiment, active controller-network element message management module 326 can be configured to enable receipt, at the active controller 304, of one or more keep-alive messages, from the network element 306, and prepare/send response to the received keep-alive messages to enable the network element 306 to continue communication with the active controller 304. Such keep-alive messages from the network element 306 to the active controller 304 can be sent either through the active control channel or through the active data channel or a combination thereof. In an aspect, the frequency of sending keep-alive messages from the network element 306 to the active controller 304 can be lesser than the frequency of the keep-alive messages from the standby controller 302 to the active controller 304. One should appreciate that functional modules similar to ones disclosed for active/standby controllers can also be implemented for network element 306, the same have not been illustrated for simplicity of the disclosure. For instance, network element 306 can include modules including, but not limited to, standby control and data channel establishment module, active control and data channel establishment module, network element-active controller message management module, and network element-standby controller message management module, among other like modules.

According to one embodiment, the message management module 312/324 can be configured at any or both of active controller 304 and standby controller 302 to enable standby controller 302 to send at least one keep-alive message to active controller 304. Any desired/configured format can be defined for the keep-alive messages such that the messages are transmitted at high frequency and therefore at relatively short time intervals (e.g., less than 30 seconds apart and preferably on the order of 10 seconds apart in one embodiment). Message management module 324 at active controller 304 can be configured to send responses to the keep-alive messages sent by standby controller 302.

According to one embodiment, active controller failure detection module 314 can be configured to detect failure of active controller 304 due to non-response to the at least one keep-alive message for a predefined time period. According to one embodiment, such failure can be detected either after non-receipt of the first keep-alive message response or non-receipt of a defined number of responses.

According to one embodiment, active controller notification module 316 can be configured to notify network element 306 of failure of active controller 304 through the standby control channel. Such intimation can be sent in any desired format/size/packet. According to one embodiment, as each network element may also be configured to send keep-alive messages to standby controller 302, such failure notification can be provided to network element 306 by standby controller 302 as part of the response to the keep-alive message from network element 306. According to another embodiment, active takeover module 318 can be configured to enable standby controller 302 to takeover as the new active controller. In an aspect, active controller takeover module 318 can further be configured to transfer active sessions from active controller 304 to standby controller (new active controller) 302.

According to one embodiment, network element 306 can be configured to synchronize configuration with standby controller 302 upon failure of active controller 304. In another aspect, upon completion of the takeover, the standby control channel and standby data channel can be configured to become the new active control channel and the new active data channel. According to one embodiment, upon completion of the takeover, each network element using the new active controller can be updated about the new active controller. As mentioned above, network element 306 can include, but is not limited to, an access point, a switch, a gateway, proxy, a router, a hub, a network packet management element, among any other element/managed device.

In yet another aspect, if desired, standby controller 302 can, even after taking over as the new active controller, continue to send keep-alive messages at desired/configured time intervals to (prior) active controller 304 such that when active controller 304 starts responding to the keep-alive messages, the new active controller (standby controller 302) can synchronize the settings, network configurations, session information, among other desired parameters/attributes, and allow the earlier active controller 304 to take over again as the current active controller.

Aspects of the present disclosure can also provide for a standby network controller 302 that is configured to establish a standby control channel and a standby data channel with a network element 306, and further configured to transmit at least one keep-alive message to an active network controller 304, wherein once standby network controller 302 detects failure of active network controller 304, standby network controller 302 notifies network element 306 through the standby control channel and takes over as new active network controller.

Figure 4:
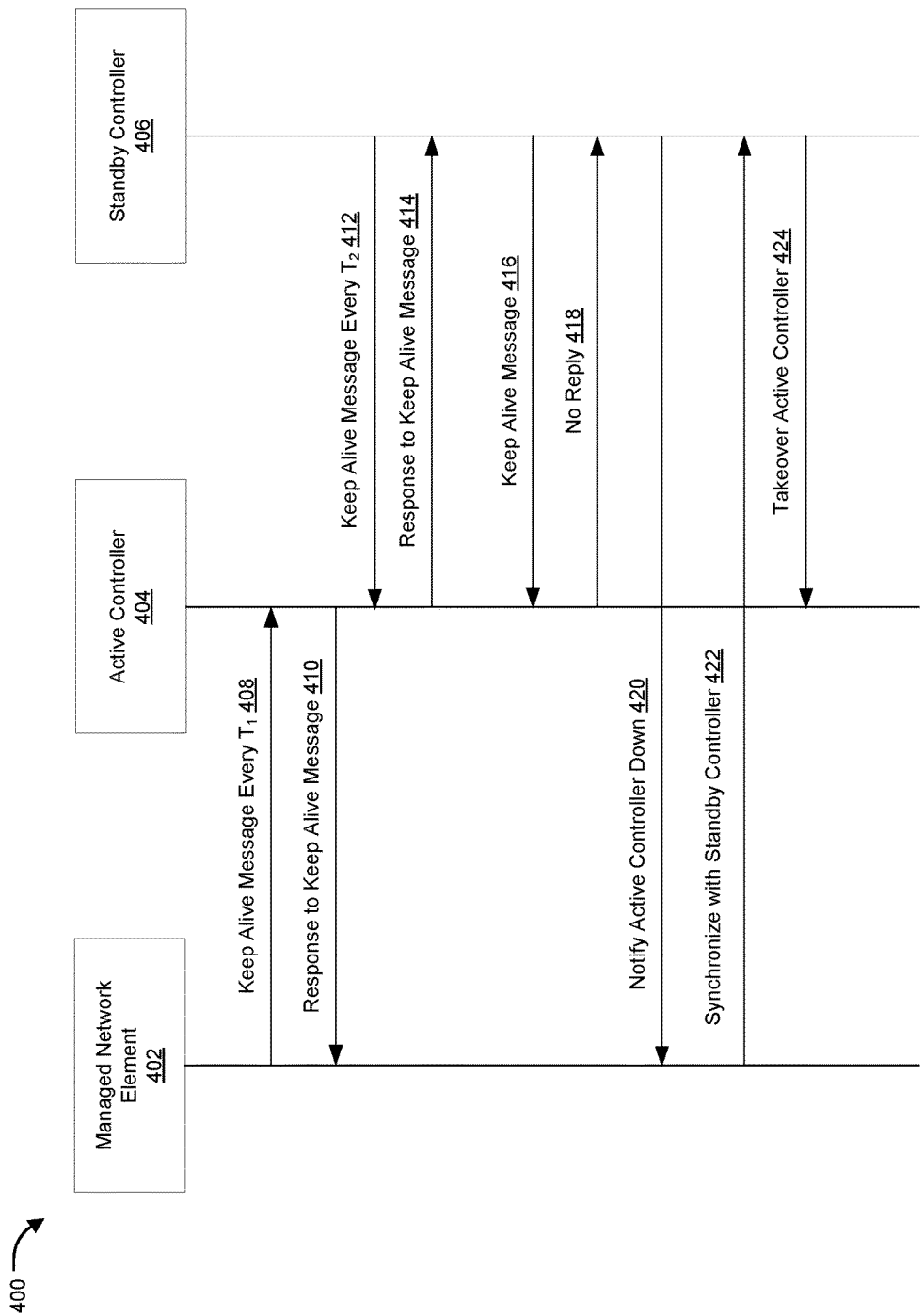
FIG. 4 is a sequence diagram illustrating message exchanges among a managed device, an active controller and a standby controller in accordance with an embodiment of the present disclosure.

FIG. 4 illustrates a sequence diagram 400 showing message exchanges among a managed device 402, an active controller 404 and a standby controller 406 in accordance with an embodiment of the present disclosure. According to one exemplary implementation, managed network element 402 can be configured to send a heartbeat keep-alive message 408 every $T_1$ seconds (a first time interval) to active controller 404 and active controller 404 can be configured to send back a response 410 to keep-alive message 408 to network element 402. Receipt of response 410 to keep-alive message 408 from active controller 404 can indicate to network element 402 that active controller 404 is operational and is handling configured operations such as network packet processing.

Instead of or in addition to keep-alive messages 408, standby controller may be configured to send one or more keep-alive messages 412 to active controller at a second time interval (e.g., every $T_2$, seconds) wherein $T_2$ is less than $T_1$. In response to each keep-alive message 412, standby controller 406 may expect to receive a response 414 from active controller 404.

In an aspect, a keep-alive message 416 can be sent by standby controller 406, wherein no response to message 416, as depicted by 418, is received by standby controller 406, based on which standby controller 406 can conclude that active controller 404 has failed and accordingly, through a notification 420, can notify network element 402 that active controller has failed so as to enable network element 402 to synchronize, say through one or more messages 422 with standby controller 406, and enable, through message 424, for example, standby controller 406 to become the new active controller.

Figure 5:
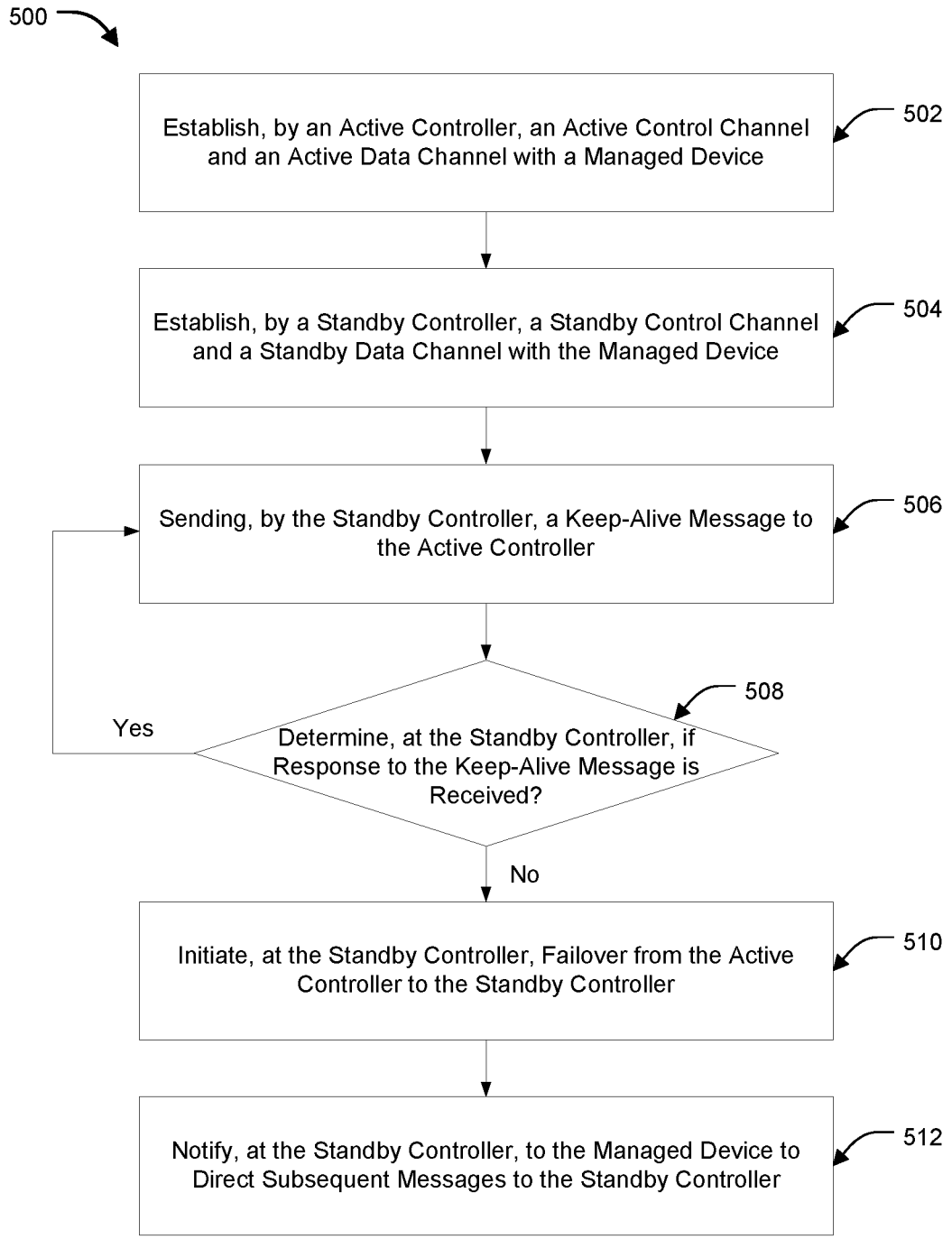
FIG. 5 is a flow diagram illustrating failover processing in accordance with an embodiment of the present disclosure.

FIG. 5 is a flow diagram 500 illustrating active controller failover processing in accordance with an embodiment of the present disclosure. At step 502, an active controller can establish an active control channel and an active data channel with a managed device via a management protocol. At step 504, a standby controller can establish a standby control channel and a standby data channel with the managed device via the management protocol. At step 506, the standby controller can periodically send a keep-alive message to the active controller. At step 508, it is determined whether the standby controller received a response to the keep-alive message, wherein when the response is received; the method goes back to step 506 and again sends a keep-alive message at a defined/configured time interval. On the other hand, when a response is not received, the method goes to step 510 where the standby controller initiates failover from the active controller to the standby controller by taking over for the active controller, and at step 512, the standby controller can notify the managed device to direct subsequent management protocol messages to the standby controller via say the standby control channel. Alternatively, standby data channel or any other means to send the data packets/communication can also be incorporated/configured and all such means are completely within the scope of the present disclosure.

Figure 6:
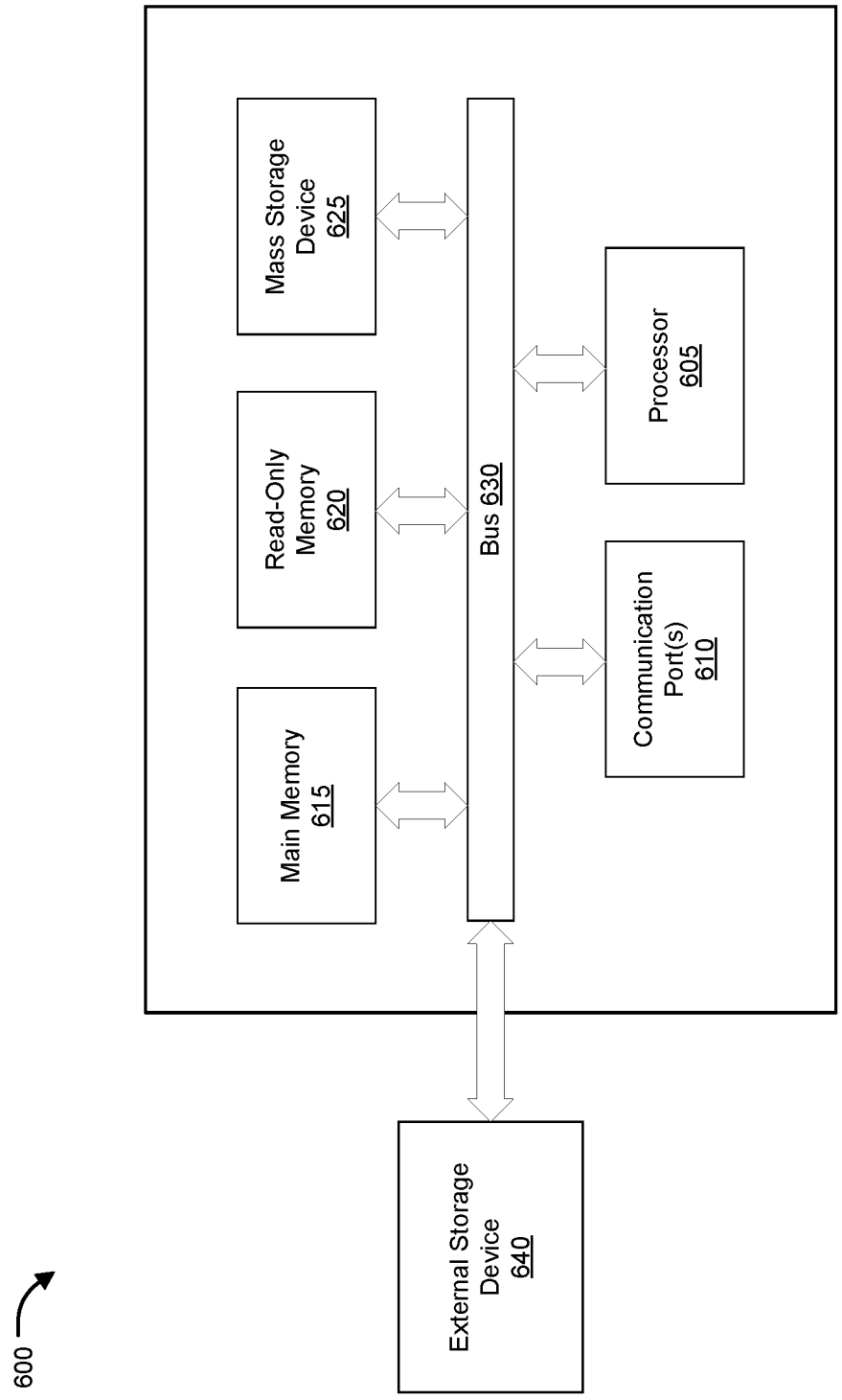
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of an active or standby wireless network controller (e.g., active controller 204, standby controller 202). Embodiments of the present disclosure include various steps, which have been describe above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports. Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention. Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects. Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605. Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc. Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to software system. Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610. Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   establishing via a management protocol, by an active wireless access point controller (APC) of an enterprise network, an active control channel and an active data channel with a managed wireless access point (AP) of the enterprise network that is managed by the active APC;
   establishing via the management protocol, by a standby APC of the enterprise network, a standby control channel and a standby data channel with the managed AP;
   providing prompt failure detection of the active APC without consuming bandwidth of the active data channel and without consuming bandwidth of the active control channel by monitoring, by the standby APC, a health status of the active APC by periodically transmitting, by the standby APC, a short-interval keep-alive message to the active APC at a frequency of once every Y seconds and tracking, by the standby APC, a first time for response thereto, if any, wherein transmission of the short-interval keep-alive message does not consume any of the bandwidth of the active data channel and does not consume any of the bandwidth of the active control channel; and
   when the health status is indicative of a failure of the active APC, then initiating failover from the active APC to the standby APC by causing the managed AP to direct subsequent management protocol messages to the standby APC via the standby control channel.

2. The method of claim 1, further comprising providing an additional layer of failure detection with respect to the active APC with minimal bandwidth impact on the active data channel and minimal bandwidth impact on the active control channel by monitoring, by the managed AP, a health status of the active APC by periodically transmitting, by the managed AP, a long-interval keep-alive message to the active APC at a frequency of once every X seconds, where Y is less than X, and tracking, by the managed AP, a second time for response thereto, if any.

3. The method of claim 2, wherein X is 30.

4. The method of claim 2, wherein Y is 10.

5. The method of claim 1, further comprising causing, by the standby APC, the managed AP to synchronize its configuration with the standby APC.

6. The method of claim 1, wherein said initiating failover further comprises causing active sessions associated with the active APC to be transferred from the active APC to the standby APC.

7. The method of claim 1, wherein said initiating failover further comprises notifying, by the standby APC, the managed AP of the failure of the active APC via the standby control channel.

8. The method of claim 1, wherein the management protocol comprises Lightweight AP Protocol (LWAPP).

9. The method of claim 1, wherein the management protocol comprises Control and Provisioning of Wireless Access Points (CAPWAP) Protocol.

* * * * *